United States Patent
LeBlanc et al.

(10) Patent No.: US 9,328,735 B2
(45) Date of Patent: May 3, 2016

(54) SPLIT RING VALVE

(71) Applicant: United Technologies Corporation, Hartford, CT (US)

(72) Inventors: Ryan Edward LeBlanc, Glastonbury, CT (US); Kevin J. Cummings, Annapolis, MD (US)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 14/040,082

(22) Filed: Sep. 27, 2013

(65) Prior Publication Data

US 2015/0027130 A1    Jan. 29, 2015

Related U.S. Application Data

(60) Provisional application No. 61/707,829, filed on Sep. 28, 2012.

(51) Int. Cl.
*F02C 9/18* (2006.01)
*F04D 27/02* (2006.01)
*F01D 17/14* (2006.01)
*F04D 29/52* (2006.01)
*F04D 29/64* (2006.01)

(52) U.S. Cl.
CPC .......... *F04D 27/0215* (2013.01); *F01D 17/141* (2013.01); *F02C 9/18* (2013.01); *F04D 27/023* (2013.01); *F04D 29/522* (2013.01); *F04D 29/524* (2013.01); *F04D 29/644* (2013.01)

(58) Field of Classification Search
CPC ............ F04D 27/0207; F04D 27/0215; F04D 29/522; F04D 29/524; F04D 29/644; F04D 27/009; F04D 27/023; F04D 29/563; F01D 17/141; F01D 17/143; F02C 9/18
USPC ...................... 60/785, 795, 262, 779, 39.091; 251/347; 415/145
See application file for complete search history.

(56) References Cited

U.S. PATENT DOCUMENTS

| | | | |
|---|---|---|---|
| 3,030,006 A | 4/1962 | Shoup, Jr. | |
| 3,074,432 A | 1/1963 | Beale et al. | |
| 3,588,268 A * | 6/1971 | Hampton | F04D 27/0215 415/145 |
| 4,390,318 A | 6/1983 | Weiler | |
| 4,463,552 A * | 8/1984 | Monhardt | F01D 25/32 60/226.1 |
| 4,674,951 A | 6/1987 | Jourdain et al. | |
| 4,827,713 A | 5/1989 | Peterson et al. | |
| 5,287,697 A | 2/1994 | Johnson et al. | |
| 5,380,151 A | 1/1995 | Kostka et al. | |
| 5,794,434 A | 8/1998 | Szupkay | |
| 6,076,423 A | 6/2000 | Honda | |
| 6,092,987 A | 7/2000 | Honda et al. | |
| 6,106,227 A * | 8/2000 | Honda | F01D 17/00 415/126 |
| 6,742,324 B2 | 6/2004 | Bachelder et al. | |
| 6,802,691 B2 | 10/2004 | Chlus | |
| 6,881,032 B2 | 4/2005 | Malmborg | |
| 7,249,929 B2 | 7/2007 | Cummings et al. | |
| 7,581,382 B2 | 9/2009 | Sadil et al. | |
| 7,850,419 B2 | 12/2010 | Vrljes et al. | |
| 8,075,246 B2 | 12/2011 | Albert et al. | |
| 8,152,460 B2 | 4/2012 | Brunet et al. | |

* cited by examiner

*Primary Examiner* — Steven Sutherland
(74) *Attorney, Agent, or Firm* — Kinney & Lange, P.A.

(57) ABSTRACT

A valve includes a body with bleed ports and a ring. The ring surrounds the body and includes two adjacent ring segments. The ring is movable between an open position and a closed position, the latter of which prevents flow through the ports.

20 Claims, 8 Drawing Sheets

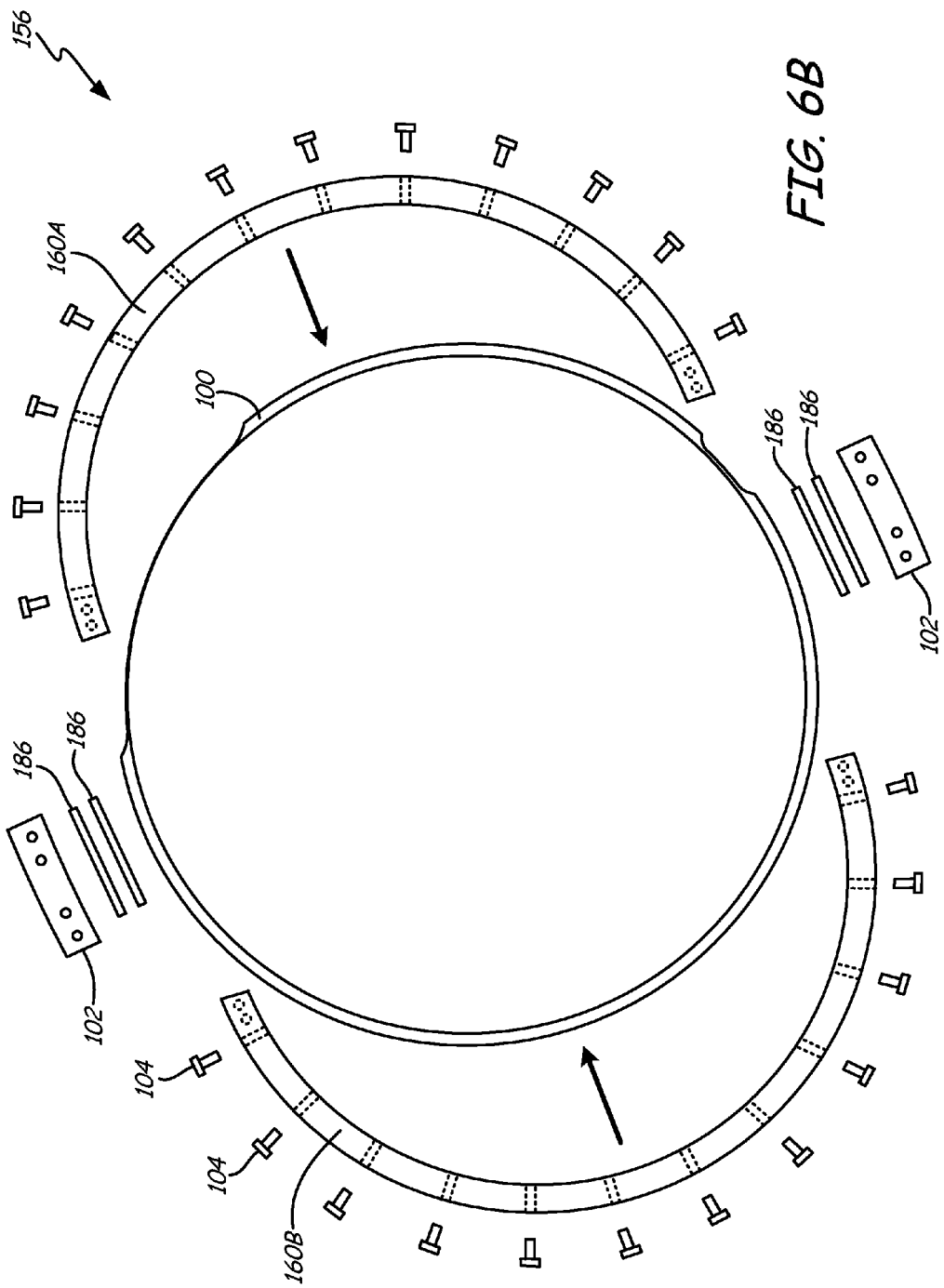

SPLIT RING VALVE

BACKGROUND

The present invention relates generally to gas turbine engines, and more particularly to a circumferential valve of a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

During start-up of a gas turbine engine, the low pressure turbine is not providing power to turn the low pressure compressor. Therefore, the low pressure compressor includes a valve to vent the air from the low pressure compressor so that rotating the low pressure compressor is easier. In addition, during acceleration and deceleration, the output of the low pressure compressor may need to be vented in order to maintain pressure balance between the low and high pressure compressors to prevent stalling thereof. (These are only two examples of why a valve is placed in the low pressure compressor.) The air from the low pressure compressor escapes through ports in the body, but flow through these ports must be prevented to allow for normal operation of the gas turbine engine.

SUMMARY

A valve includes an annular body, a port, and a split ring. The port communicates through the body in a substantially radial direction. The split ring moves in an axial direction for obstructing the port.

A valve includes a body including a plurality of port and a ring substantially surrounding the body. The ring has first and second ring segments, and is movable between open and closed positions. The ring prevents flow through the ports in the closed position.

A turbine engine having a compressor, a combustor, and a turbine includes a valve having a body with a plurality of ports and a split ring with first and second segments. The ring is movable axially to control flow of bleed air from the compressor.

BRIEF DESCRIPTION OF THE DRAWINGS

FIG. 6B is an exploded view of the alternate embodiment ring.

DETAILED DESCRIPTION

Figure 1:
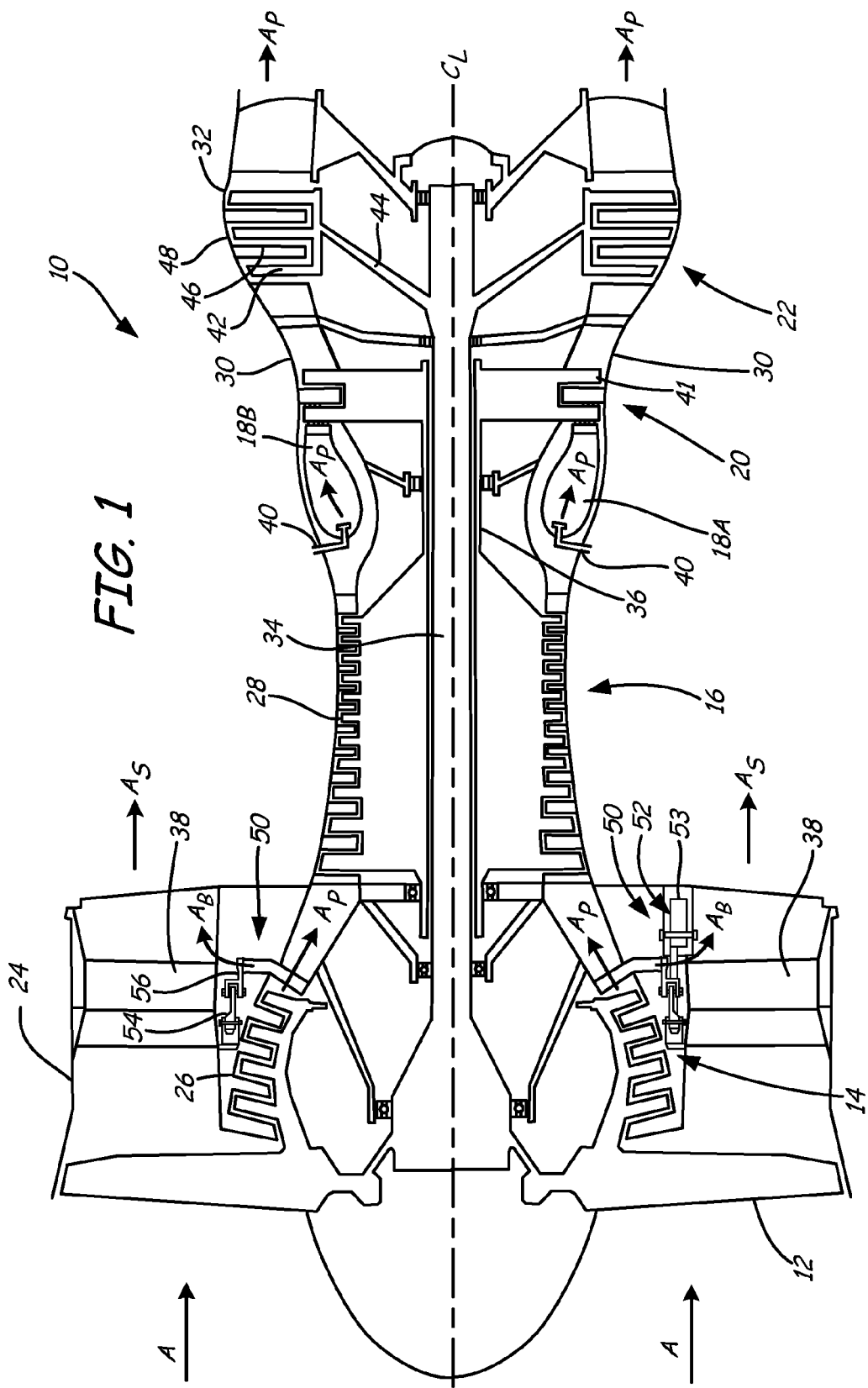
FIG. 1 is a schematic side cross-section view of a gas turbine engine.

FIG. 1 shows a cross section of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, case section 48, valve 50, actuator 52, idler 54, ring 56, inlet air A, primary air $A_P$, secondary air $A_S$ (also known as bypass air), bleed air $A_B$, and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20, and low pressure turbine (LPT) 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by low pressure turbine 22 through low pressure shaft 34 (either directly as shown or through a gearbox, not shown) to accelerate secondary air $A_S$ (also known as bypass air) through exit guide vanes 38, thereby producing a major portion of the thrust output of engine 10. Primary air $A_P$ (also known as gas path air) is directed first into low pressure compressor 14 and then into high pressure compressor 16. LPC 14 and HPC 16 work together to incrementally step up the pressure of primary air $A_P$. HPC 16 is rotated by HPT 20 through low pressure shaft 34 to provide compressed air to combustor section 18. The compressed air is delivered to combustors 18A-18B, along with fuel through injectors 40, such that a combustion process can be carried out to produce the high energy gases necessary to turn high pressure turbine 20 and low pressure turbine 22. Primary air $A_P$ continues through gas turbine engine 10 whereby it is typically passed through an exhaust nozzle to further produce thrust.

After being compressed in LPC 14 and HPC 16 and participating in a combustion process in combustors 18A-18B (FIG. 1) to increase pressure and energy, primary air $A_P$ flows through HPT 20 and LPT 22 such that blades 32 and blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns fan 12 and LPC 14.

Valve 50 is attached to LPC case 26 and annularly surrounds LPC 14. As stated previously, it is advantageous to open valve 50 at particular times. In the illustrated embodiment, this occurs by actuator 52 (specifically motor or actuation means 53) forcing ring 56 forward with assistance from a plurality of idlers 54 (although only one is shown in FIG. 1). When valve 50 is open, some of primary air $A_P$ flows through valve 50 which is shown as bleed air $A_B$. This bleed air $A_B$ joins secondary air $A_S$ and is expelled from gas turbine engine 10.

The components and configuration of gas turbine engine 10 as shown in FIG. 1 allow for at least a portion of primary air $A_P$ that is traveling through a central passageway to be radially diverted or bled off of the mainstream flow and added to secondary air $A_S$. This portion of primary air $A_P$ is called bleed air $A_B$, and it is exhausted from LPC 14 into the atmosphere. This reduces the force required to turn low pressure shaft 34 (e.g. during start-up) and can be used to balance LPC 14 and HPC 16 to prevent compressor stall (e.g. during acceleration or deceleration).

Depicted in FIG. 1 is one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
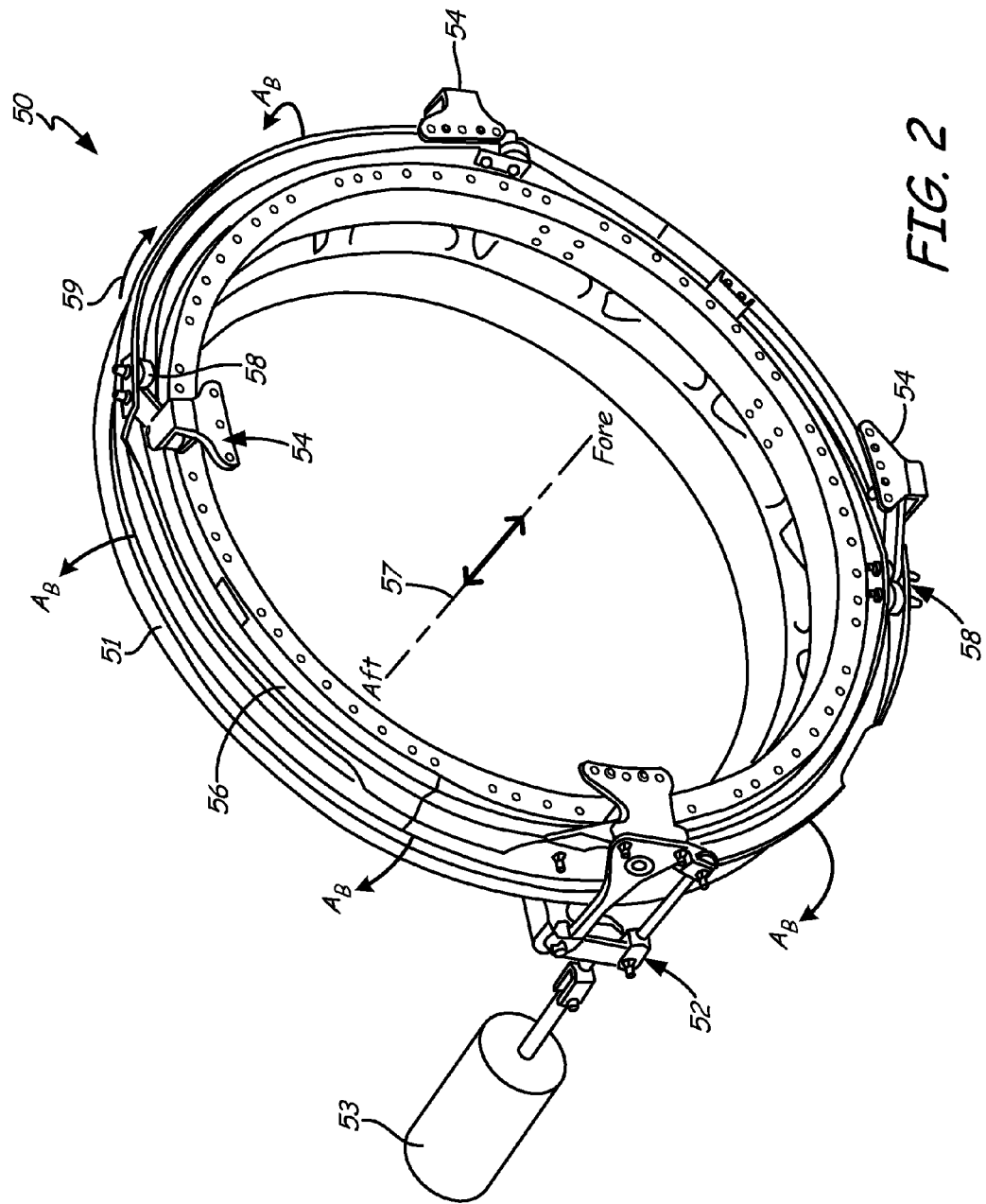
FIG. 2 is a perspective view of a valve.

In FIG. 2, a perspective view of valve 50 is shown. Valve 50 is connected to LPC case 26 (shown in FIG. 1) on the fore and aft sides of valve 50. Valve 50 includes an annular valve duct or body 51, actuator 52 (with motor or actuation means 53), a plurality of idlers 54, and an actuating valve head or ring 56. In the illustrated embodiment actuator 52 is attached to body 51, although the connection between actuator 52 and LPC case 26 is not shown and neither are the connections between LPC case 26 and idlers 54.

In the illustrated embodiment, valve 50 is shown in the closed position. In this position, ring 56 prevents bleed air $A_B$ from escaping out of LPC 14 (shown in FIG. 1). As stated previously, actuator 52 exerts forward force on ring 56 in order to open valve 50. As ring 56 moves forward along axis 57, ring 56 is guided by idlers 54. Due to the multiple linkage arrangement of valve 50, ring 56 rotates slightly (as indicated by circumferential arrow 59) as ring 56 moves forward. When valve 50 is open, bleed air $A_B$ escapes from LPC 14 (shown in FIG. 1) substantially around the entire circumference of valve 50.

The components and configuration of valve 50 as shown in FIG. 2 allow for valve 50 to bleed air out of LCP 14 (shown in FIG. 1). Depicted in FIG. 2 is one embodiment of the present invention, to which there are alternative embodiments. For example, valve 50 can be arranged such that ring 56 moves aftward in order to open, as the designations of directions such as "aft" and "fore" are merely descriptive of the illustrated embodiment.

Figure 3:
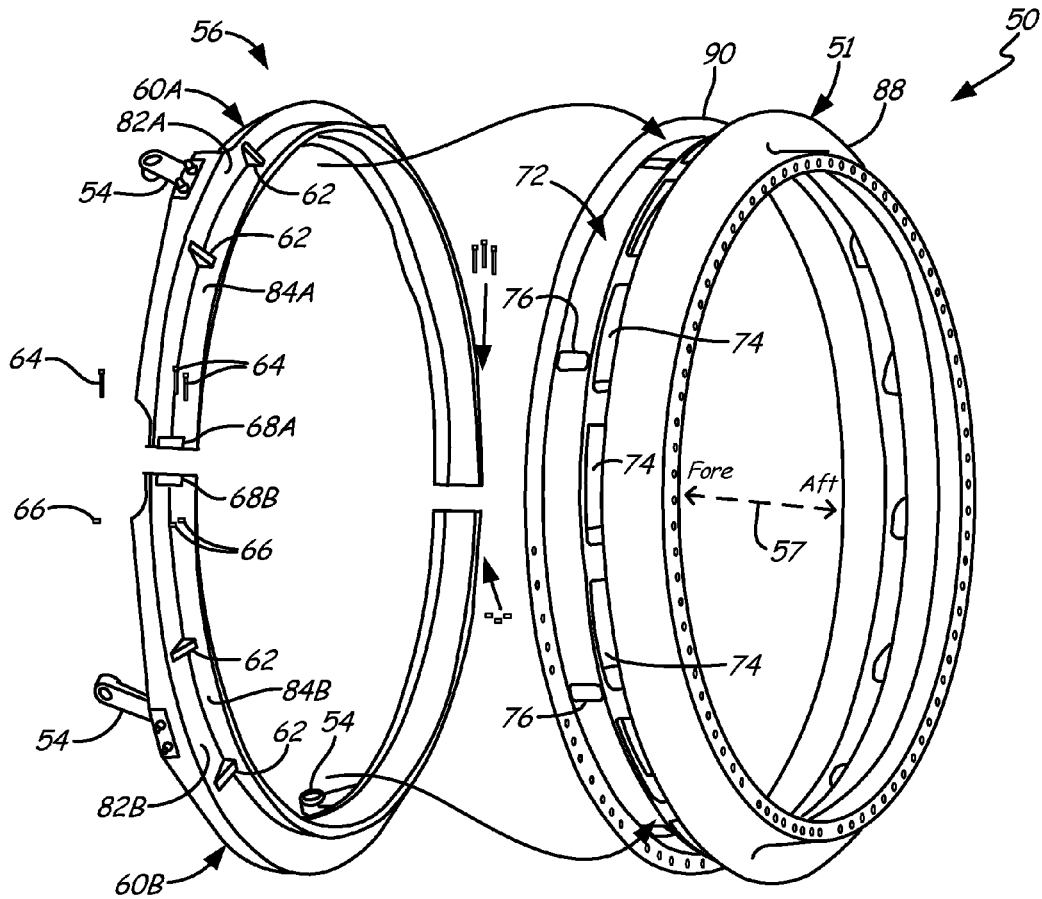
FIG. 3 is an exploded view of the valve including ring segments and a body.
Figure 4A:
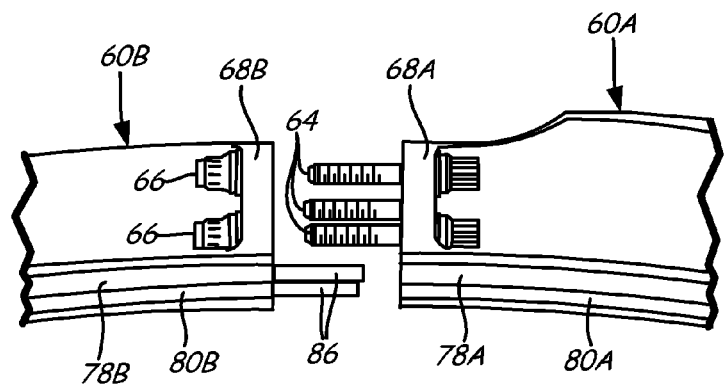
FIG. 4A is an exploded view of the ring segments including aft flanges.
Figure 4B:
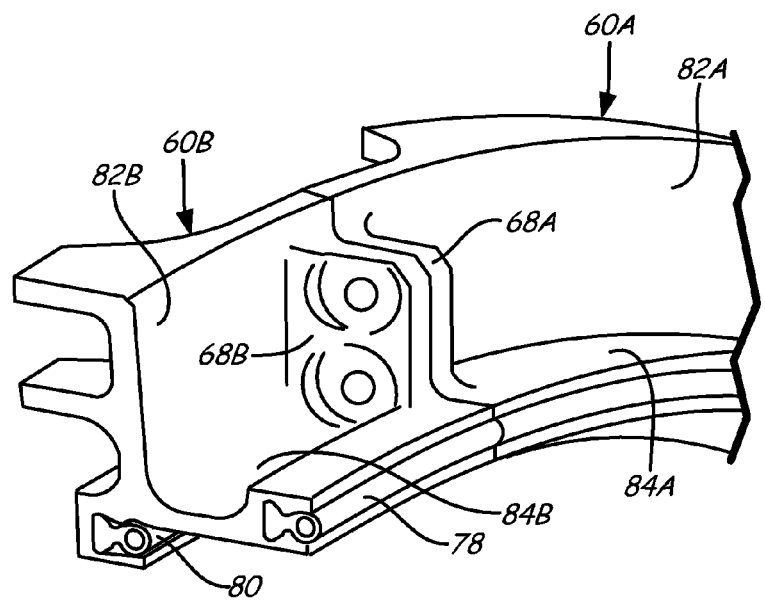
FIG. 4B is an aft perspective view of the aft flanges.
Figure 4C:
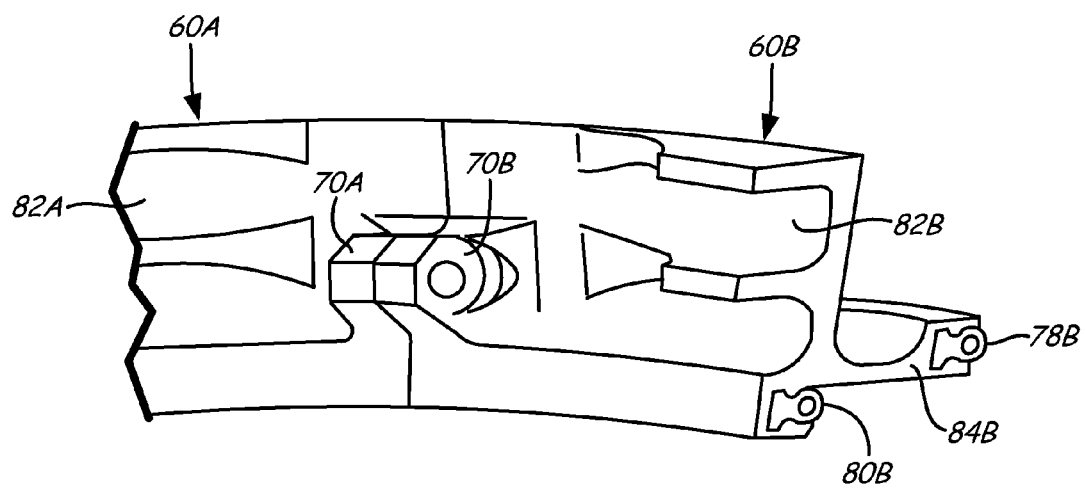
FIG. 4C is a fore perspective view of fore flanges.

FIG. 3 shows an exploded view of valve 50 including ring segments 60A-60B and body 51. FIG. 4A shows an exploded view of ring segments 60A-60B including aft flanges 68A-68B. FIG. 4B shows a perspective view of aft flanges 68A-68B. FIG. 4C shows a perspective view of fore flanges 70A-70B. FIGS. 3 and 4A-4C will now be discussed simultaneously.

Valve 50 comprises body 51 and ring 56. Ring 56 includes ring segments 60A-60B, and each ring segment 60 includes rigidity member 82 and seal support 84. Rigidity member 82 has radial stiffener 83A extending substantially perpendicular to axis 57 and a pair of annular ribs 83B-83C extending substantially parallel to axis 57. Idlers 54 are rotatably connected to ribs 83B-83C of rigidity member 82. Gussets 62 extend between rigidity member 82 and seal support 84 in order to stiffen ring 56 and maintain the perpendicularity between rigidity member 82 and seal support 84 when ring 56 is being moved by actuator 52.

In the illustrated embodiment, seal support 84 extends substantially parallel to axis 57 and includes aft bulb seal 78 and fore bulb seal 80. Bulb seals 78, 80 are comprised of a silicone rubber material with a metallic backing material and a liner comprised of Nomex® available from DuPont™ of Newark, Del. Bulb seals 78, 80 are fed into seal support 84 at the open end of each ring segment 60.

In the illustrated embodiment, each ring segment 60 extends circumferentially and at substantially the same arc length. At each end of each ring segment 60 there is aft flange 68 on the aft side of ring segment 60 and fore flange 70 on the fore side of ring segment 60 (as shown in FIG. 4C). Thereby, ring segment 60A can be connected to ring segment 60B at flanges 68A-68B and 70A-70B using fasteners. Although only one of each of flanges 68A, 68B, 70A, and 70B is shown in FIG. 3, there is a substantially similar arrangement on the opposite side of ring 56 that is not visible.

Figure 5:
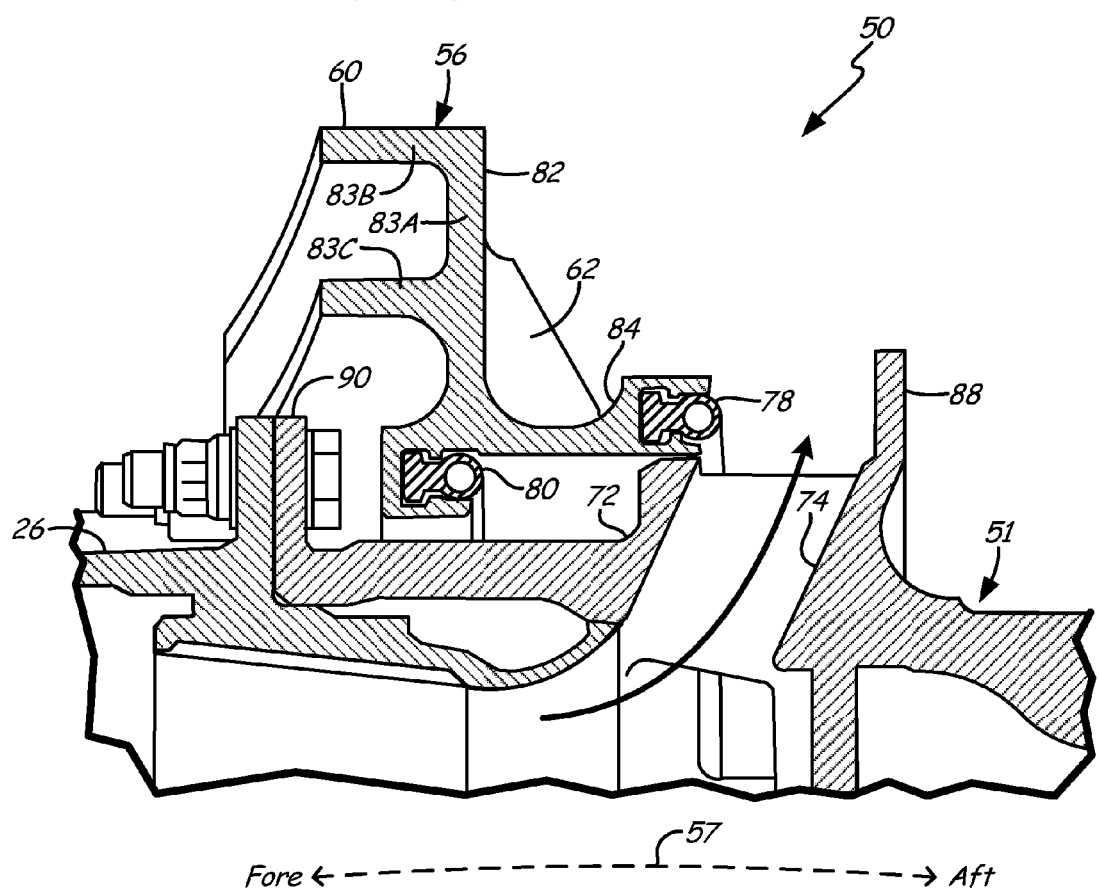
FIG. 5 is a cross sectional view of the valve including ring segments and a body.

Referring to FIGS. 3 and 5, body 51 comprises rear flange 88 and front flange 90 both projecting radially outward and defining raceway 72 therebetween for receipt of the ring 56. Raceway 72 includes a plurality of ports 74 and a plurality of rub pads 76 upon which ring 56 slides during opening and closing of valve 50.

In order to assemble valve 50, ring segments 60A-60B are positioned generally around raceway 72. Then seal connectors 86 (which are comprised of a silicone rubber material) are placed in the ends of aft bulb seals 78A-78B and fore bulb seals 80A-80B, connecting aft bulb seal 78A to aft bulb seal 78B and connecting fore bulb seal 80A to fore bulb seal 80B thereby forming continuous seals made of a resilient material. Ring segments 60A-60B are then fastened together. In the illustrated embodiment of FIG. 3, these fasteners may be a plurality of bolts 64 and nuts 66, with bolts 64 being tangentially positioned in flanges 68A-68B and 70A-70B, respectfully, and wherein each bolt is captured by a nut 66. Idlers 54 and actuator 52 (shown in FIG. 2) can then be connected to ring 56 so that ring 56 can be guided by idlers 54 when being moved by actuator 52.

The components and configuration of valve 50 as shown in FIGS. 3 and 4A-4C allow for ring 56 to be positioned in raceway 72 proximate to ports 74. Furthermore, valve 50 is also kept simple due to only having two ring segments 60. In addition, the steps of assembly of valve 50, prior to the connection of ring 56 to actuator 52 and idlers 54, can be completed with or without body 51 being connected to LPC case 26 (shown in FIG. 2). Similarly, the steps of disassembly can have flexibility. In particular, ring 56 can be removed without disconnecting body 51.

Depicted in FIGS. 3 and 4A-4C is one embodiment of the present invention, to which there are alternative embodiments. For example, in the illustrated embodiment, each ring segment 60 surrounds substantially half of body 51, but there can be more ring segments 60 than two. In such an embodiment, the lengths of ring segments 60 may or may not be all the same. For another example, bulb seals 78, 80 may be continuous and not bisected depending on the shape of bulb seals 78, 80, the orientation of valve 50, and the ease of assembly desired.

FIG. 5 shows a cross sectional view of valve 50 including ring 56 and body 51. Ring 56 is positioned adjacent to raceway 72. In the illustrated embodiment, valve 50 is in an open position. When valve 50 moves to the closed position, ring 56 slides axially aft along axis 57. More specifically, when valve 50 is closed, aft bulb seal 78 contacts rear flange 88 (which carries an annular seat face) and fore bulb seal 80 contacts the vertical portion of raceway 72. This substantially prevents flow through ports 74 (although only one is visible in FIG. 5).

Valve 50 is attached to LPC case 26 at front flange 90. In the illustrated embodiment, raceway 72 is significantly inboard from rear flange 88 and front flange 90. Flanges 88, 90 have larger outer diameters than the inner diameter of ring 56 (as measured near fore bulb seal 80). Therefore, the assembly of valve 50 requires a split ring 56 or else ring 56 could not be positioned adjacent to raceway 72.

The components and configuration of valve 50 allow for ring 56 and raceway 72 to have diameters that are smaller than that of rear flange 88 and front flange 90. This reduces the size of ring 56 and raceway 72.

Figure 6A:
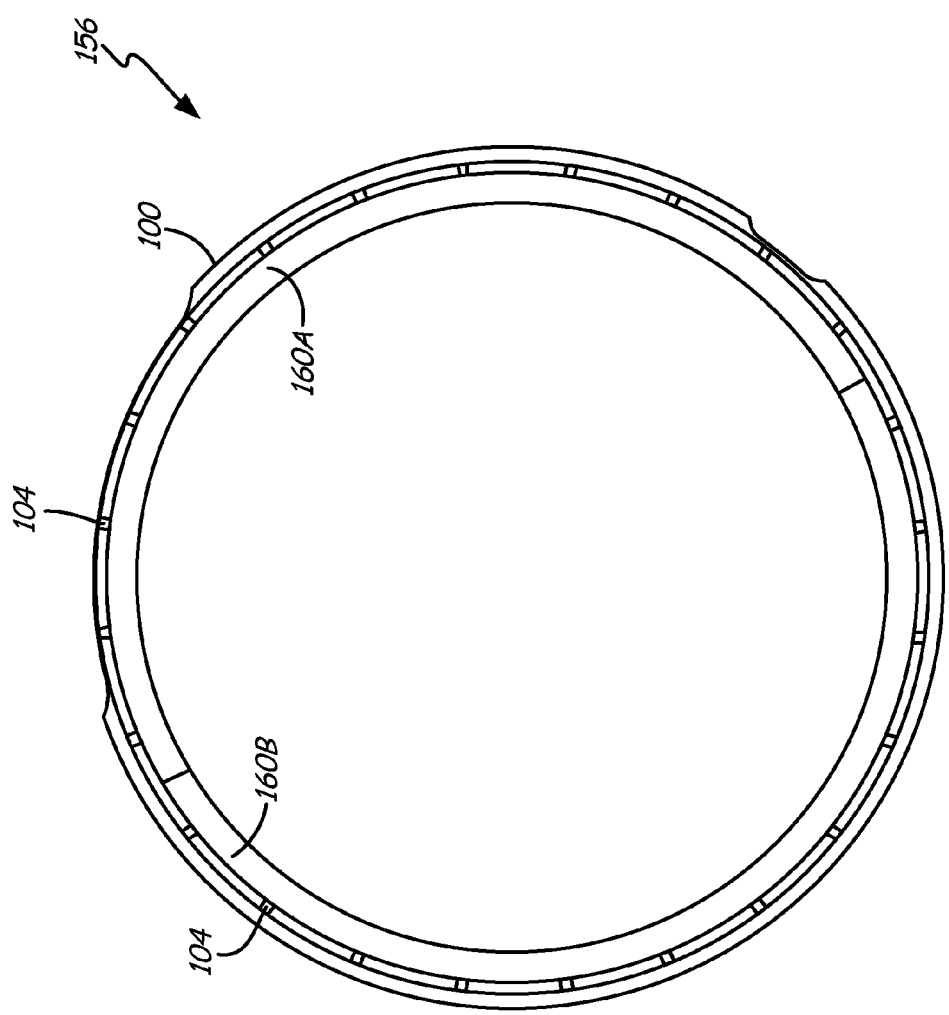
FIG. 6A is an afterward view of an alternate embodiment ring.
Figure 7:
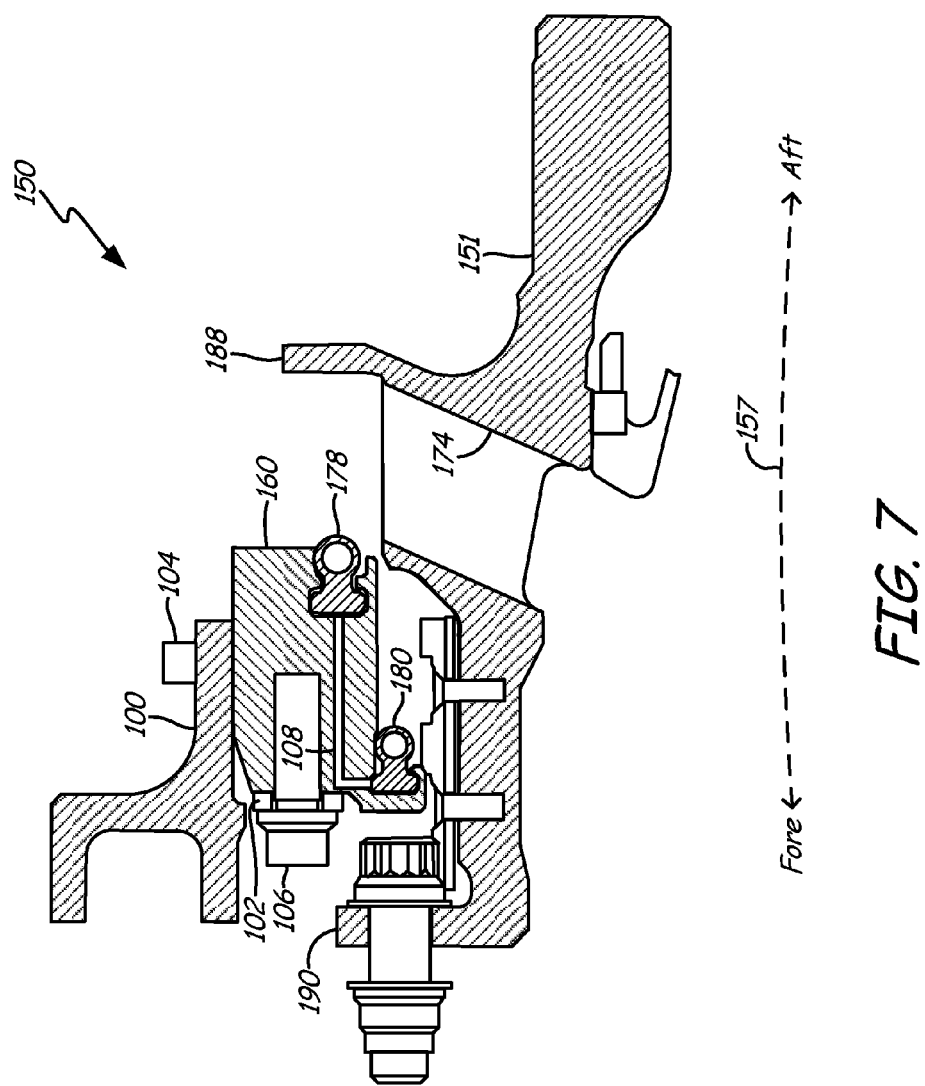
FIG. 7 is a cross sectional view of an alternate embodiment valve including the ring and a body.

FIG. 6A shows an afterward view of alternate embodiment ring 156. FIG. 6B is an exploded view of alternate embodiment ring 156. FIG. 7 shows a cross sectional view of alternate embodiment valve 150 including alternate embodiment ring 156 and alternate embodiment valve annular body 151. FIGS. 6A-6B and 7 will now be discussed simultaneously.

In the illustrated alternate embodiment, similar parts to the previous embodiment have reference numerals that are one hundred greater. For example, ring segment 160 is similar in function to ring segment 60. Ring 156 comprises ring segment 160A that is adjacent to ring segment 160B. More specifically, the ends of ring segments 160A-160B are joined on the forward sides by brackets 102. Brackets 102 are attached to ring segments 160A-160B by a plurality of axial fasteners 106. In the illustrated embodiment, ring segments 160A-160B each have four axially-oriented tapped holes (two at each end) into which axial fasteners 106 (i.e. bolts) are screwed.

Both ring segments 160A-160B are surrounded by outer ring 100. Outer ring 100 is attached to ring segments 160A-160B by a plurality of radial fasteners 104. In the illustrated embodiment, ring segments 160A-160B each have a plurality of radially oriented tapped holes into which axial fasteners 106 (i.e. bolts) are screwed.

Ring 156 is positioned adjacent to raceway 172. In the illustrated embodiment of FIG. 7, valve 150 is in an open position. When valve 150 moves to the closed position, ring 156 slides axially aft along axis 157. More specifically, when valve 150 is closed, aft bulb seal 178 contacts rear flange 188 (which carries an annular seat face) and fore bulb seal 180 contacts the vertical portion of raceway 172. This substantially prevents flow through ports 174 (although only one is visible in FIG. 7).

In the illustrated embodiment, raceway 172 is significantly inboard from rear flange 188 and front flange 190. Flanges 188, 190 have larger outer diameters than the inner diameter of ring 156 (as measured near fore bulb seal 180). Therefore, the assembly of valve 150 requires at least a partially split ring 156 or else ring 156 could not be positioned adjacent to raceway 172. But flanges 188, 190 of body 151 have smaller outer diameters than the inner diameter of outer ring 100. Therefore, outer ring 100 can be placed adjacent to raceway 172 without being split itself, although ring segments 160A-160B must be split because their combined inner diameter is smaller than the outer diameters of flanges 188, 190.

In order to assemble valve 150, ring segments 160A-160B are positioned generally around raceway 172. A layer of sealant 108 is applied to one of the ring segments 160A-160B at each joint. In the illustrated embodiment, sealant 108 is room-temperature vulcanizing (RTV) silicone. Then seal connectors 186 are placed in the ends of aft bulb seals 178A-178B and fore bulb seals 180A-180B, connecting aft bulb seal 178A to aft bulb seal 178B and connecting fore bulb seal 180A to fore bulb seal 180B. Then ring segments 160A-160B are fastened together with at least one bracket 102 of the fastener assembly and a plurality of axial fasteners 106. Then outer ring 100 is slid past front flange 190 and onto ring segments 160A-160B and fastened thereto with radial fasteners 104. Idlers 54 (shown in FIG. 2) and actuator 52 (shown in FIG. 2) can then be connected to ring 156.

The components and configuration of valve 150 allow for ring 156 to include a full hoop outer ring 100 while still enabling installation onto body 151 that has a smaller inner diameter raceway 172. In addition, sealant 108 permits ring segments 160A-160B to be used without substantial leakage through the seal joints therebetween.

Depicted in FIGS. 6A-6B and 7 is one embodiment of the present invention, to which there are alternative embodiments. For example, brackets 102 are optional, and if they are used, they can function as an assembly fixture that is removed after ring segments 160A-160B are fastened to outer ring 100.

It should be recognized that the present invention provides numerous benefits and advantages. For example, the valve weighs less because raceway can be relatively small in diameter. In addition, there is flexibility in methods of assembly and disassembly that can important depending on which parts or assemblies need to be serviced.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve comprising:
   an annular body disposed concentrically to an axis;
   a port communicating through the annular body in a direction comprising a radial component; and
   a split ring constructed and arranged to move in an axial direction for obstructing the port, the split ring including a plurality of inner ring segments and an outer ring that is adjacent to the plurality of inner ring segments and is radially outward therefrom such that the outer ring at least partially surrounds the plurality of inner ring segments.

2. The valve of claim 1, further comprising:
   a plurality of fastener assemblies for connecting the plurality of inner ring segments.

3. The valve of claim 1, wherein the port is one of a plurality of ports spaced circumferentially apart from one-another in the annular body.

4. The valve of claim 1, wherein the split ring is positioned in an annular raceway in an outer surface of the annular body.

5. The valve of claim 1, wherein at least one of the plurality of inner ring segments is fastened to the outer ring.

6. A valve comprising:
   a body including a plurality of ports; and
   a split ring surrounding the body, the split ring including a first ring segment, a second ring segment adjacent to the first ring segment, and an outer ring that is adjacent to the first and second ring segments and is radially outward therefrom such that the outer ring at least partially surrounds the first and second ring segments;
   wherein the ring is movable between an open position and a closed position, wherein the ring prevents flow through the ports when the ring is in the closed position.

7. The valve of claim 6, wherein the first ring segment and the second ring segment each surround substantially half of the body.

8. The valve of claim 6, wherein at least one of the first and second ring segments includes a rigidity member, a seal support, and a gusset that extends from the rigidity member to the seal support.

9. The valve of claim 6, and further comprising:
   a plurality of seals connected to at least one of the first and second ring segments.

10. The valve of claim 6, wherein the body further comprises:
    a first flange;
    a second flange; and
    a raceway, located between the first and second flanges, that includes the plurality of ports.

11. The valve of claim 6, wherein the first ring segment is fastened to the second ring segment.

12. The valve of claim 6, and further comprising:
    a plurality of seals connected to at least one of the first and second ring segments.

13. The valve of claim 12, and further comprising:
    a sealant positioned between the first and second ring segments.

14. The valve of claim 6, wherein at least one of the first and second ring segments is fastened to the outer ring.

15. The valve of claim 6, wherein the first ring segment is fastened to the second ring segment with a bracket.

16. A gas turbine engine comprising:
    a compressor including a split ring valve, the split ring valve comprising:
      a body including a plurality of ports; and
      a split ring substantially surrounding the body and movable axially to control flow of bleed air from the compressor, the split ring including a plurality of inner ring segments and an outer ring that is adjacent to the plurality of inner ring segments and is radially outward therefrom such that the outer ring at least partially surrounds the plurality of inner ring segments;
    a combustor downstream of the compressor; and
    a turbine downstream of the combustor.

17. The gas turbine engine of claim 16, and further comprising:
    an actuator assembly connected to the split ring that moves the split ring axially with respect to an engine centerline, the split ring being movable between an open position and a closed position, wherein the split ring prevents flow of bleed air through the plurality of ports when the split ring is in the closed position.

18. The gas turbine engine of claim 16, wherein the plurality of inner ring segments comprises a first ring segment that surrounds substantially a first half of the body and a second ring segment that is adjacent to the first ring segment and surrounds substantially a second half of the body.

19. The gas turbine engine of claim 16, wherein each of the plurality of inner ring segments includes a rigidity member, a seal support, and a gusset that extends from the rigidity member to the seal support.

20. The gas turbine engine of claim 16, wherein at least one of the plurality of inner ring segments is fastened to the outer ring.

* * * * *

UNITED STATES PATENT AND TRADEMARK OFFICE
CERTIFICATE OF CORRECTION

PATENT NO.        : 9,328,735 B2
APPLICATION NO.   : 14/040082
DATED             : May 3, 2016
INVENTOR(S)       : Ryan Edward LeBlanc et al.

It is certified that error appears in the above-identified patent and that said Letters Patent is hereby corrected as shown below:

IN THE SPECIFICATION

Col. 2, Line 7
    Delete "afterward"
    Insert --aftward--

Col. 5, Line 31
    Delete "afterward"
    Insert --aftward--

Signed and Sealed this
Fifth Day of July, 2016

Michelle K. Lee
*Director of the United States Patent and Trademark Office*